Feb. 13, 1934.                    A. M. NIVEN                    1,947,222
                        INTERNAL COMBUSTION ENGINE
                            Filed Nov. 26, 1929

INVENTOR.
ARCHIE M. NIVEN
BY
                     ATTORNEY.

Patented Feb. 13, 1934

1,947,222

UNITED STATES PATENT OFFICE

1,947,222

INTERNAL COMBUSTION ENGINE

Archie M. Niven, Detroit, Mich., assignor, by mesne assignments, to Continental Aircraft Engine Company, a corporation of Delaware Application November 26, 1929
Serial No. 409,974

25 Claims. (Cl. 184—6)

This invention relates to an internal combustion engine, and is more particularly related to an oil filter structure and to its assembly with the engine. My invention is particularly adapted for use with an aircraft engine of the radial type, though obviously it may be embodied in engines other than radial engines and in engines other than those used for aircraft.

It is the object of my invention to facilitate the distribution of pure oil to the engine parts to be lubricated, by constructing an engine in which an oil filter may be so assembled, as to more efficiently distribute pure oil to an oil conducting passageway that communicates with a plurality of bearings to be lubricated.

A further object of my invention is to facilitate the assembly of an oil filter with an internal combustion engine by constructing means, which permit the said oil filter to be directly connected with the oil distributing system with a minimum of time and labor.

A still further object of my invention is to provide an improved engine structure wherein a plentiful supply of pure oil is readily supplied to the oil distributing system, by providing means for more efficiently and readily sealing the filter chamber against leakage.

Figure 1:
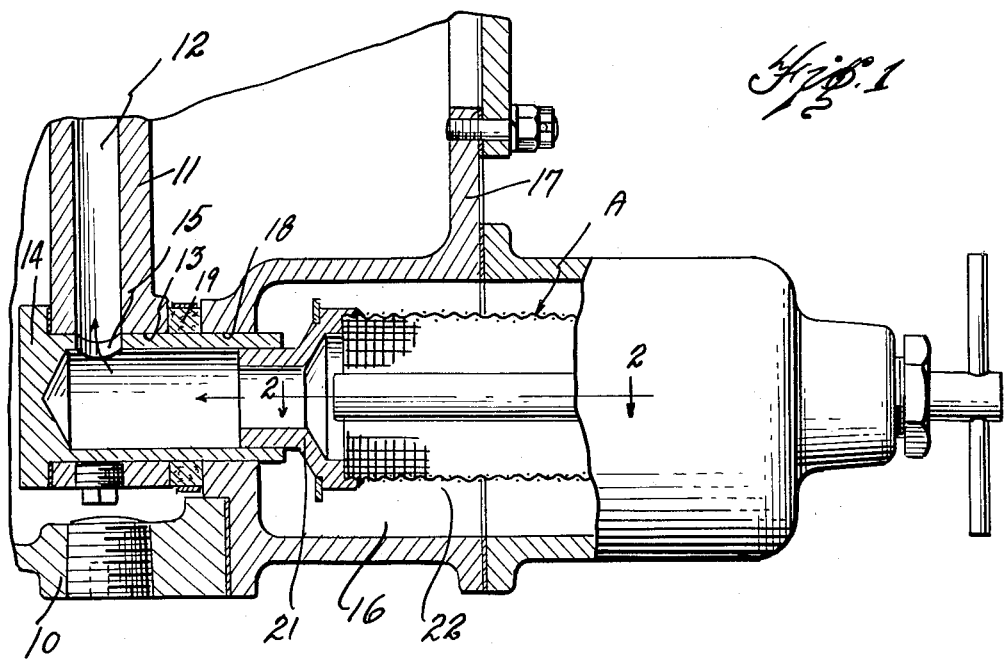
Figure 2:
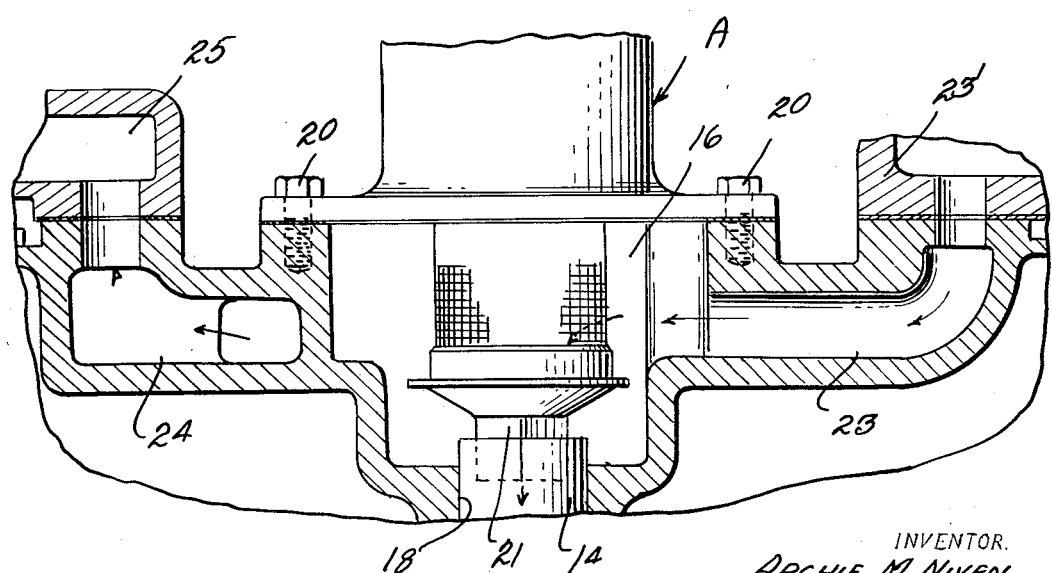

For a more detailed understanding of my invention, reference may be had to the accompanying drawing, which illustrates one form which my invention may assume, and in which:

Fig. 1 is a detailed view, partly in section, of a rear portion of an internal combustion engine, and showing an oil filter assembled therewith and constructed in accordance with my invention, Fig. 2 is a horizontal sectional view thereof taken substantially on the line 2—2 of Fig. 1.

My improved oil filter assembly structure is adapted for use with an internal combustion engine of the radial type which is provided with the customary crankcase 10, and with means adjacent the lower portion thereof for supporting an oil filter, which filters the oil prior to its entrance into the oil distributing system. A wall 11 is preferably provided with engines of this character, said wall being secured to the crankcase by any suitable means and preferably provided with oil conducting means or conduits 12 for conveying the filtered oil to the various engine parts to be lubricated.

This wall 11 is preferably provided with an opening 13, into which a hollow plug or nipple 14 is secured, this nipple being open at one end and having a press fit within the opening. A port 15 in the side wall of the nipple is adapted to register with the oil distributing conduit 12 in the wall. The hollow sleeve portion of the nipple projects beyond the rear face of the wall 11 and is adapted to project into an oil chamber or reservoir 16 carried by the gear case cover 17, the oil chamber being provided with an outlet opening or port 18, through which the nipple extends.

The joint between the gear case cover and the wall about the opening 18 is sealed by an annular gasket 19, that encircles the nipple, and when the said gear case cover is secured to said crankcase the gasket 19 is compressed, thus effectively sealing the joint. No harm is caused by the leakage of oil along the nipple between the conduit and the oil chamber and thus the employment of gaskets between the nipple and gear case is unnecessary.

A filter A of standard construction is adapted to be secured to the gear case cover by the bolts 20, and the filter projects into the oil chamber 16. The hollow tubular nose 21 of the filter is reduced in diameter and adapted to be telescoped within the open end of the nipple 14, the oil in said chamber being thereby caused to flow through the filtering screen 22, through the hollow nose 21 into the hollow nipple 14, from whence it is permitted to flow through the port 15 in the nipple into the oil distributing conduit 12.

Oil, which comes from a source of lubricant supply (not shown) is force fed into the oil chamber 16 through a passage 23 carried by the gear case cover by means of a pump 23' or other suitable feeding means. After the oil has performed its work it is drained from the crankcase through a passage 24 by a scavenging pump 25 and conducted to the source of lubricant supply, where it may be again recirculated through the lubricating system.

It may be noted that the oil filter may be very readily and quickly assembled with the engine, without disturbing the sealing means intermediate the crankcase cover and the wall structure carried by the crankcase. The nose of the filter is detachably connected with the open end of the nipple, and when the bolts 20 are removed the filter and filter casing are very readily disassembled.

Furthermore the nipple serves as a pilot for positioning the gear case cover with respect to the wall structure 11, and the filter carried by said gear case cover is thus readily and accurately axially aligned with the said nipple.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In an internal combustion engine having a crankcase and a gear case secured thereto, said crankcase provided with means for supporting one or more mechanisms to be lubricated, and with means for conducting oil to said mechanism, an oil filter assembly therefor, which comprises, a nipple detachably supported by said crankcase and communicating with said oil conducting means, and an oil filter including a casing therefor secured to said gear case and connected with said nipple.

2. In an internal combustion engine having a crankcase and a gear case secured thereto, said crankcase provided with means for supporting one or more mechanisms to be lubricated, and with means for conducting oil to said mechanisms, an oil filter assembly therefor which comprises, a nipple supported by said crankcase and communicating with said oil conducting means, and an oil filter including a casing therefor secured to the rear face of said gear case and connected with said nipple.

3. In an internal combustion engine having a crankcase and a gear case secured thereto, said crankcase provided with means for supporting one or more mechanisms to be lubricated, and with means for conducting oil to said mechanisms, an oil filter assembly therefor which comprises, a nipple supported by said crankcase and communicating with said oil conducting means, and an oil filter including a casing therefor secured to said gear case and detachably connected with said nipple.

4. In an internal combustion engine having a crankcase and a gear case secured to said crankcase, said crankcase provided with a wall extending transversely of said crankshaft for supporting one or more mechanisms to be lubricated and with means for conducting oil to said mechanisms, an oil filter assembly therefor, which comprises, a nipple supported by said wall and communicating with said oil conducting means, and an oil filter including a casing therefor secured to said gear case and connected with said nipple.

5. In an internal combustion engine having a crankcase and a gear case secured to said crankcase, said crankcase provided with a wall extending transversely of said crankshaft for supporting one or more mechanisms to be lubricated and with means for conducting oil to said mechanims, an oil filter assembly therefor, which comprises, a hollow nipple supported by said wall and closed at one end, said nipple communicating with said oil conducting means, and an oil filter including a casing therefor secured to said gear case and connected with the open end of said nipple.

6. In an internal combustion engine having a crankcase and a gear case secured to said crankcase, said crankcase provided with a wall extending transversely of said crankshaft for supporting one or more mechanisms to be lubricated and with means for conducting oil to said mechanisms, an oil filter assembly therefor, which comprises, a hollow nipple supported by said wall and closed at one end, said nipple communicating with said oil conducting means, and an oil filter supported by said gear case and connected with the open end of said nipple.

7. In an internal combustion engine having a crankcase and a gear case secured thereto, said crankcase provided with means for supporting one or more mechanisms to be lubricated, and with means for conducting oil to said mechanisms, an oil filter assembly therefor, which comprises, a nipple supported by said crankcase and communicating with said oil conducting means, and an oil filter supported by said gear case and arranged in open communication with said nipple.

8. In an internal combustion engine having a crankcase and a separate gear case secured to said crankcase, said crankcase provided with means for supporting one or more mechanisms to be lubricated, and with means for conducting oil to said mechanisms, an oil filter assembly therefor which comprises, a hollow nipple detachably supported by said crankcase and closed at one end, said nipple communicating with said oil conducting means, and an oil filter cooperatively connected with said nipple and communicating with the open end thereof, said filter supported at a point remote from said nipple.

9. In an internal combustion engine having a crankcase provided with a wall for supporting one or more mechanisms to be lubricated, and a gear case secured thereto and provided with an oil chamber having an outlet opening, means for conducting oil to said mechanisms, a nipple supported by said wall and communicating with said oil conducting means, said nipple communicating with the outlet opening of said oil chamber, and an oil filter supported by said gear case and connected with said nipple.

10. In an internal combustion engine having a crankcase element provided with a wall for supporting one or more mechanisms to be lubricated, a gear case element secured to said crankcase element and provided with an oil chamber, means for conducting oil to said mechanisms, a nipple supported by one of said elements and arranged to connect the oil chamber with said oil conducting means, and an oil filter supported by said gear case and connected with said nipple.

11. In an internal combustion engine having a crankcase element provided with a wall for supporting one or more mechanisms to be lubricated, a gear case element secured to said crankcase element and provided with an oil chamber, means for conducting oil to said mechanisms, a nipple supported by one of said elements and arranged to connect the oil chamber with said oil conducting means, and an oil filter supported by said gear case within said oil chamber and connected with said nipple.

12. In an internal combustion engine having a crankcase element provided with a wall for supporting one or more mechanisms to be lubricated, a gear case element secured to said crankcase element and provided with an oil chamber having inlet and outlet openings, means for conducting oil to said mechanisms, a nipple supported by one of said elements and arranged to connect the oil chamber with said oil conducting means, and an oil filter supported by said gear case within said oil chamber intermediate the inlet and outlet openings and connected with said nipple.

13. In an internal combustion engine having a crankcase element provided with a wall for supporting one or more mechanisms to be lubricated, a gear case element secured to said crankcase element and provided with an oil chamber having inlet and outlet openings, means for conducting oil to said mechanisms, a hollow nipple closed at one end supported by one of said elements and arranged to connect the oil chamber with said oil conducting means, and an oil filter supported by said gear case within said oil chamber intermediate the inlet and outlet openings and connected to the open end of said nipple.

14. In an internal combustion engine having a crankcase element provided with a wall for supporting one or more mechanisms to be lubricated, a gear case element secured to said crankcase element and provided with an oil chamber having inlet and outlet openings, means for conducting oil to said mechanisms, a hollow nipple closed at one end supported by one of said elements and arranged to connect the oil chamber with said oil conducting means, and an oil filter having a nose portion and supported by said gear case within said oil chamber intermediate the inlet and outlet openings, the nose portion of said filter telescoped within the open end of said nipple, thereby necessitating the passage of oil through said filter when passing from the oil chamber to the means for conducting the oil to the mechanisms to be lubricated.

15. In an internal combustion engine having a crankcase element provided with a wall for supporting one or more mechanisms to be lubricated, a gear case element secured to said crankcase element and provided with an oil chamber having inlet and outlet openings, means for conducting oil to said mechanisms, a nipple carried by one of said elements and communicating with said oil conducting means, said nipple telescopically engaged with said outlet opening, and sealing means interposed between said gear case and crankcase to seal the joint around said nipple.

16. In an internal combustion engine having a crankcase element provided with a wall for supporting one or more mechanisms to be lubricated, a gear case element secured to said crankcase element and provided with an oil chamber having inlet and outlet openings, means for conducting oil to said mechanisms, a nipple carried by one of said elements and communicating with said oil conducting means, said nipple telescopically engaged with said outlet opening, and a ring gasket circling said nipple and interposed between said gear case and crankcase to seal the joint therebetween.

17. In an internal combustion engine having a crankcase and a separate gear case structure secured to said crankcase, said crankcase provided with means for supporting one or more mechanisms to be lubricated and with means for conducting oil to said mechanisms, an oil filter having an outlet portion positioned and removably supported by said crankcase in cooperative communicating connection with said oil conducting means, said oil filter including a casing secured to said gear case structure, said filter removable with the gear case structure.

18. In an internal combustion engine having separate crankcase and gear case portions, one of said portions provided with means for supporting one or more mechanisms to be lubricated and with means for conducting oil to said mechanism including an oil inlet and an oil filter having an oil outlet positioned and removably supported by said crankcase in cooperative communicating connection with said oil inlet and secured to an outer wall of said gear case.

19. In an internal combustion engine having separate crankcase and gear case portions, one of said portions provided with means for supporting one or more mechanisms to be lubricated and with means for conducting oil to said mechanism including an oil inlet, and an oil filter having an oil outlet positioned and supported by the crankcase and adapted for removable cooperative communicating connection with said oil inlet, said filter carried by an outer wall of said gear case.

20. In an internal combustion engine having separate crankcase and gear case portions, one of said portions provided with means for supporting one or more mechanisms to be lubricated and with means for conducting oil to said mechanism including an oil inlet, and an oil filter having a nose provided with an oil outlet, said nose positioned and supported by the crankcase to bring the oil outlet carried thereby into registration with the oil inlet, said filter secured to an outer wall of said gear case.

21. In an internal combustion engine having crankcase and gear case portions providing an inner wall spaced from the outer wall of the gear case, said inner wall arranged to support one or more mechanisms to be lubricated and provided with means for conducting oil to said mechanisms, said inner wall having an oil chamber communicating with said oil conducting means and having an opening, and an oil filter supported by the outer wall of said gear case and having an outlet port arranged to register with the opening carried by said oil chamber.

22. In an internal combustion engine having crankcase and gear case portions providing an inner wall spaced from the outer wall of the gear case, said inner wall arranged to support one or more mechanisms to be lubricated and provided with means for conducting oil to said mechanisms, said inner wall having an oil chamber communicating with said oil conducting means and having an opening, and an oil filter supported by the outer wall of said gear case and provided with a nose portion arranged to project into said opening carried by said oil chamber, said nose portion having an oil outlet communicating with the interior of said oil chamber.

23. In an internal combustion engine having crankcase and gear case portions providing an inner wall spaced from the outer wall of the gear case, said inner wall arranged to support one or more mechanisms to be lubricated and provided with means for conducting oil to said mechanisms, said inner wall having an oil chamber communicating with said oil conducting means and having an opening, a pilot portion surrounding said opening and projecting rearwardly of said inner wall, and an oil filter supported by the outer wall of said gear case and provided with an inner portion arranged for telescopic assembly with said pilot portion, said inner portion of said filter having an oil outlet communicating with the interior of said oil chamber.

24. In an internal combustion engine having crankcase and gear case portions providing an inner wall spaced from the outer wall of the gear case, said inner wall arranged to support one or more mechanisms to be lubricated and provided with means for conducting oil to said mechanisms, said inner wall having an oil chamber communicating with said oil conducting means and having an opening, a pilot portion surrounding said opening and projecting rearwardly of said inner wall, and an oil filter supported by the outer wall of said gear case and provided with an inner portion, arranged for detachable telescopic assembly with said pilot portion, said inner portion of said filter having an oil outlet communicating with the interior of said oil chamber.

25. In an internal combustion engine having crankcase and gear case portions providing an inner wall spaced from the outer wall of the gear case, said inner wall arranged to support one or more mechanisms to be lubricated and provided with means for conducting oil to said mechanisms, said inner wall having an oil chamber communicating with said oil conducting means and having an opening, and an oil filter supported by the outer wall of said gear case and provided with an inner portion of reduced diameter arranged to telescopically project into said opening and provided with an oil outlet communicating with the interior of said oil chamber.

ARCHIE M. NIVEN.